May 30, 1933.  N. E. GARDINER ET AL  1,911,682
MEANS FOR SPLICING INNER TUBES
Filed Jan. 22, 1929   2 Sheets-Sheet 2
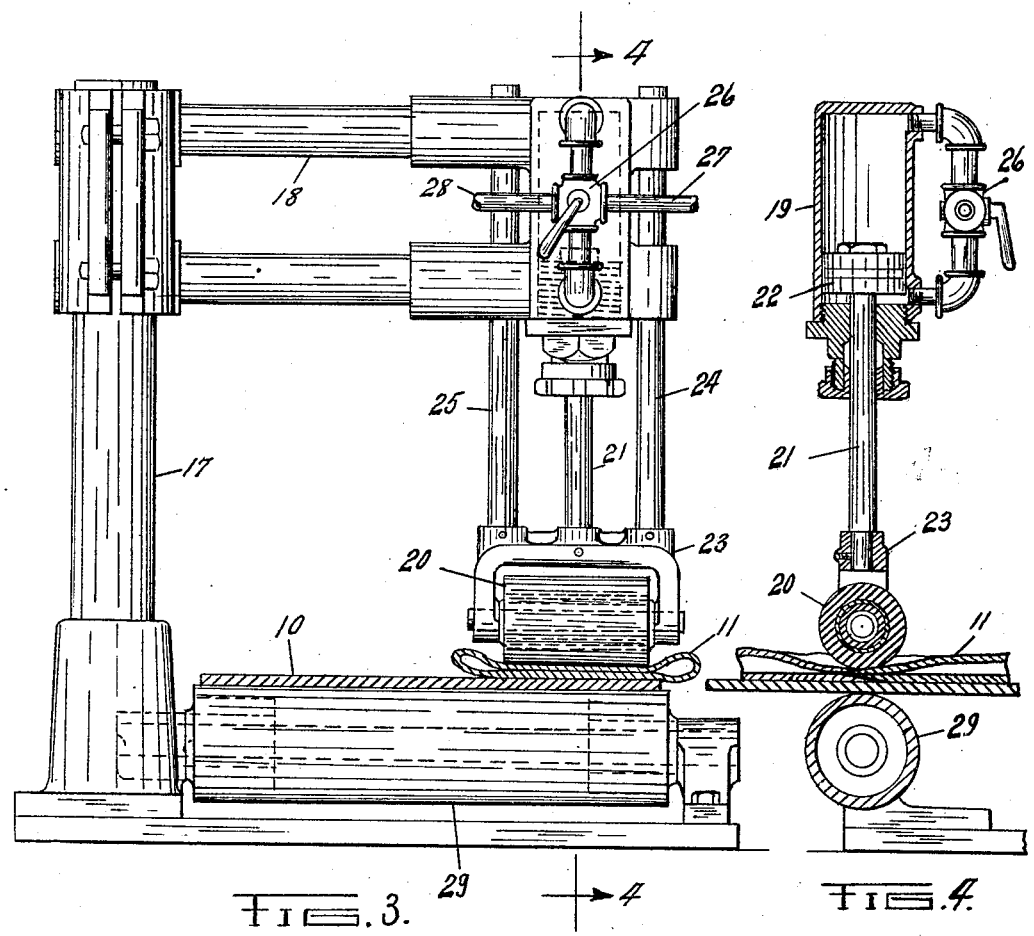
INVENTORS
Nell E. Gardiner.
George B. Nichols.
BY
Clyd Barrow
ATTORNEYS.

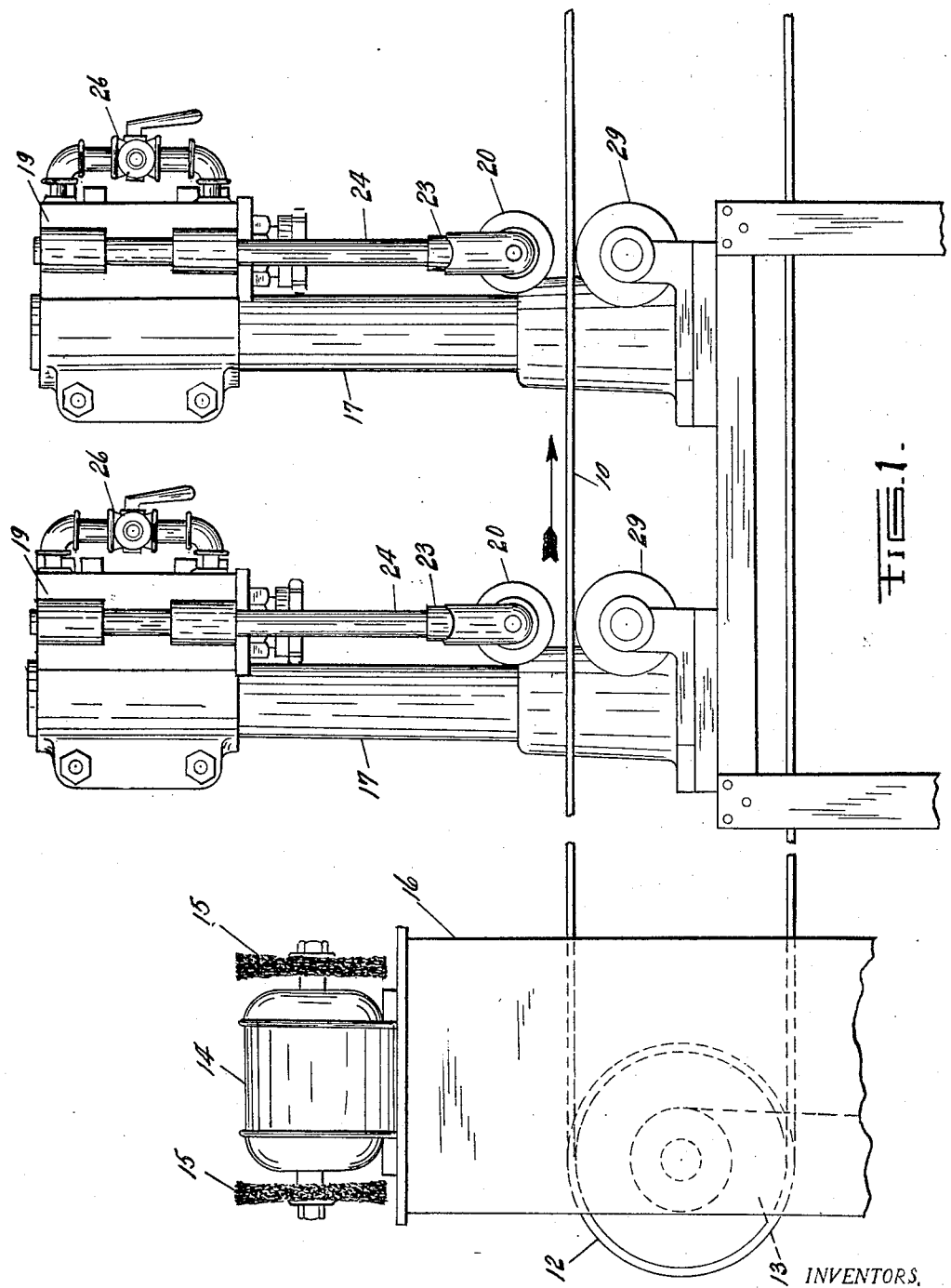

Patented May 30, 1933

1,911,682

UNITED STATES PATENT OFFICE

NELL E. GARDINER, OF CUYAHOGA FALLS, AND GEORGE B. NICHOLS, OF AKRON, OHIO, ASSIGNORS TO THE FIRESTONE TIRE & RUBBER COMPANY, OF AKRON, OHIO, A CORPORATION OF OHIO

MEANS FOR SPLICING INNER TUBES

Application filed January 22, 1929. Serial No. 334,300.

This invention relates to machines for use in the manufacture of inner tubes for pneumatic tires.

The modern method of manufacturing inner tubes comprises shaping the rubber stock into tubular form, cutting off a suitable length of the tubing, skiving and buffing the ends of the tubing, splicing said ends together, compressing or rolling said splice, and finally molding the tube in a circular vulcanizing mold or press. A common defect in tubes heretofore so manufactured has been an improper splicing of the tube ends resulting in an insecure union of the ends of the tube and a leaky construction.

The object of the present invention is to devise an improved means for rolling or compacting the splice in the uncured tube to provide a perfect union of the tube ends. A further object is to devise a means for successively rolling or compacting various portions of the tube splice while the tube is passing along a conveyor. Another object is to devise a machine having fluid pressure operated rollers for successively compacting various portions of the tube splice. A still further object is to devise mechanical means for splicing inner tubes while the latter are passing along a conveyor whereby a great portion of the hand labor involved may be eliminated.

The foregoing and other objects are obtained by the device illustrated in the accompanying drawings and described below. It is to be understood that the invention is not limited to the specific form thereof disclosed herein.

Of the accompanying drawings,

Figure 1 is a front elevation of apparatus embodying the principles of the invention;

Figure 2 is a plan view of one of the splicing presses comprising a portion of said apparatus;

Figure 3 is a side elevation thereof; and

Figure 4 is a vertical section taken on the line 4—4 of Figure 3.

Referring in detail to the drawings, the numeral 10 denotes a conveyor belt upon which are carried suitable lengths 11 of unvulcanized rubber tubing to be made into pneumatic tire tubes, the belt being trained over end pulley 12 journaled in standard 13 and over a drive pulley (not shown). Mounted adjacent the conveyor belt and intermediate the ends thereof is a tube end buffing device comprising a motor 14 having buffing wheels 15, 15 attached to the ends of the shaft thereof and being mounted on a supporting table 16. Further along the conveyor belt are mounted a pair of presses for rolling or compacting the spliced ends of the tubes. The presses are of identical construction and each press consists of a supporting standard 17 and bracket 18, and a double acting fluid pressure operated cylinder 19 carried over the conveyor for actuating a roller 20 of rubber or other suitable material towards and from the conveyor belt by means of its piston rod 21 and piston 22.

The roll 20 is journaled in a yoke 23 attached to the end of the piston rod and is prevented from relative rotation by means of rods 24 and 25 slidable in bracket 18. A four-way valve 26 is provided alternately to connect the upper and lower ends of the cylinder selectively with a fluid pressure line 27 and exhaust 28. In order to give added support to the conveyor belt a roll 29 is supported directly under roll 20 of the press.

The operation of the apparatus comprises placing measured lengths of unvulcanized rubber tubing upon the conveyor, skiving the ends of the tubes by hand as the tubes pass along the conveyor, buffing the skived ends of the tubes on buffing wheels 15, one end being buffed externally and the other buffed internally, the ends joined by hand in overlapping relation to form a splice, and the spliced portion of the tube passed under the presses for rolling or compacting the union. Where a pair of the presses are provided as above described the splices of the tubes may be rolled as the latter pass along the conveyor, the tube being passed under the first press flatwise and being turned edgewise and flattened out to pass under the second press for completing the rolling of the splice. It will be understood that a single press may be employed in which case after the splice has passed under the press the first time the tube is brought back, turned edgewise and flattened out to pass under the press the second time to complete the operation. As the spliced portion of the tube passes under the press four-way valve 26 is turned to admit pressure to the upper end of the cylinder for forcing roller 20 against the tube as illustrated in Figure 4. When the rolling operation is completed valve 26 is turned to admit pressure to the lower end of the cylinder for raising roll 20. The tube is then ready for vulcanization and the usual finishing steps. The practise of the above described invention results in a substantial saving in time of preparation and elimination of defective tubes resulting from improper splicing of the tube ends.

Modifications of the apparatus disclosed may be resorted to without departing from the spirit of the invention or the scope thereof as defined by the appended claims.

What is claimed is:

1. Apparatus for the preparation of inner tubes prior to vulcanization comprising, in combination, a movable conveyor belt, a fluid pressure operated roll reciprocable into engagement with a tube passing along the conveyor for compressing the overlapped ends thereof, and a second fluid pressure operated roll reciprocable to engage with the tube passing along the conveyor for compressing the overlapped ends thereof to complete a secure splicing of the tube ends.

2. Apparatus for the preparation of inner tubes prior to vulcanization comprising, in combination, a movable conveyor belt, and a fluid pressure operated roll reciprocable into engagement with a tube passing along the conveyor for compressing the overlapped ends thereof to complete a secure splicing of the tube ends.

In witness whereof we have hereunto affixed our signatures this 19th day of December, 1928.

GEORGE B. NICHOLS.
NELL E. GARDINER.